March 24, 1970     W. WILHELMSEN     3,501,906
FRAME SUPPORT FOR CABLE WINDING MACHINE Filed Dec. 4, 1967     2 Sheets-Sheet 1

*Inventor*
WILLY WILHELMSEN
By Edward Goldberg
*Attorney*

United States Patent Office 3,501,906
Patented Mar. 24, 1970

---

3,501,906
FRAME SUPPORT FOR CABLE WINDING MACHINE
Willy Wilhelmsen, Snaroya, Norway, assignor to International Standard Electric Corporation, New York, N.Y., a corporation of Delaware
Filed Dec. 4, 1967, Ser. No. 687,875
Claims priority, application Norway, Dec. 3, 1966, 165,859
Int. Cl. D01h 7/02
U.S. Cl. 57—59        3 Claims

ABSTRACT OF THE DISCLOSURE

The rotatable frame of a cable winding machine carriage is supported on pivotable rollers which maintain alignment with the frame under varying loads and resulting deflection.

BACKGROUND OF THE INVENTION

Field of the invention

The present invention relates to a cable winding machine for laying up at least two conductors into a cable and include a rotatable carriage with cradles for conductor pay-off reels, the carriage having at least one vertically mounted rotatable frame supported by rollers.

DESCRIPTION OF THE PRIOR ART

When this mounting method is used for large machines, the frames are slightly deflected from the vertical plane in which they are originally mounted. This effect occurs because the weight of the machine varies from full to empty reels. It is not possible to build the machines so stiff that no deflection will occur and the surface of the frame bearing against the rollers will therefore vary. Due to this variation, the surfaces of the rotatable frame and the rollers will be worn excessively so that the machine loses its original adjustment.

SUMMARY OF THE INVENTION

The object of the present invention is to provide a cable winding machine wherein the various elements are maintained in their relative alignment and neither frame nor rollers are excessively worn.

The main feature of the invention is that the rollers are mounted in a pivotable support so as to follow the variations of deflection of the frame from the vertical plane, and bear ideally against the surface of the frame for any possible deflection.

When the rollers are mounted in this manner, any deflection of the rotatable frame from the vertical plane will be taken care of by a similar deflection of the rollers.

A further feature is that the axis of each of the rollers is arranged to be rotated in a vertical plane parallel to a vertical plane through the longitudinal axis of the machine. The above mentioned and other features of the invention will become apparent from the following description taken in conjunction with the drawing.

DESCRIPTION OF THE PREFERRED EMBODIMENT

Figures 1, 2:
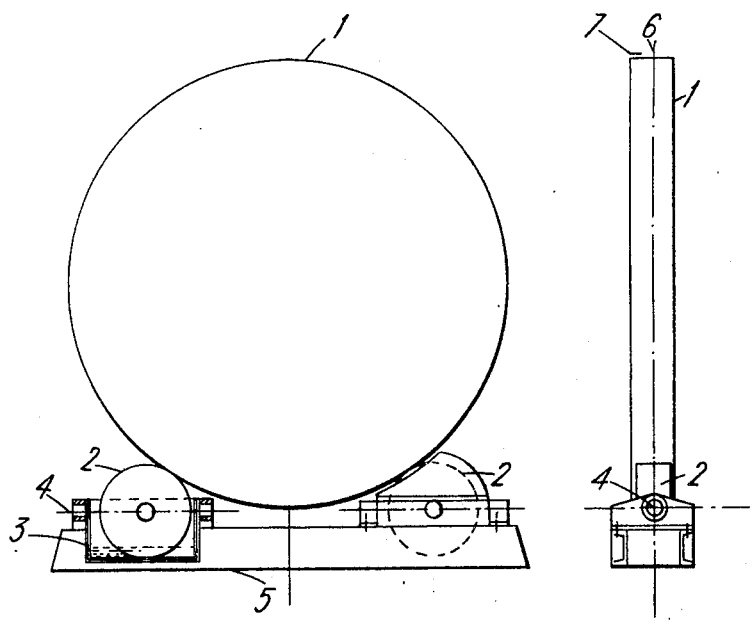
FIGURE 1 is a front schematic view of a rotatable carriage frame supported on rollers in accordance with the invention.
FIGURE 2 is a side schematic view of a rotatable carriage frame supported on rollers in accordance with the invention.

Referring now to FIGURES 1 and 2, there is shown a rotatable frame 1, which is part of a rotatable cable winding machine carriage, being supported by two rollers 2. Each of those rollers 2 is mounted in a cradle 3 which is pivotable about an axis 4 parallel to the plane of the roller 2. The roller cradles 3 are mounted in a machine block 5. When the frame 1 is deflected from the vertical plane parallel to the plane of the frame 1, indicated by line 6, due to varying weight of the conductor pay-off reels, shown in FIGURE 3, mounted on the frame, the rollers are rotated about the axis 4 so as to maintain the rollers and frame in alignment and the surface of the rollers in optimum contact with the surface 7 of the frame for any deflection. The axis of each roller also rotates in a vertical plane parallel to a vertical plane through the longitudinal axis of the machine.

Figure 3:
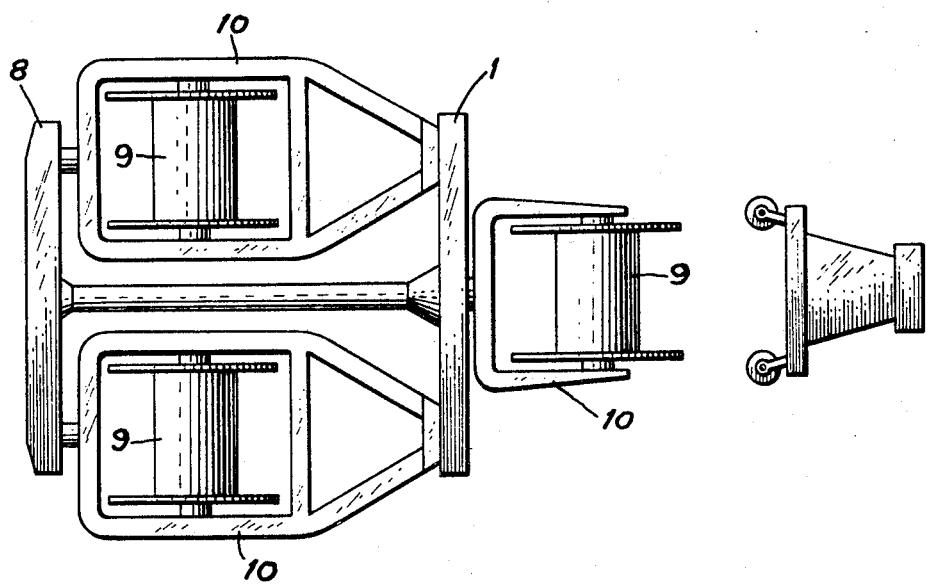
FIGURE 3 is a plan view of a typical cable winding machine which can employ the invention.

Referring now to FIGURE 3 there is shown a cable winding machine of a type well known in the prior art. A rotatable carriage 8 is arranged to be rotated about a horizontal axis. Conductors which are to be formed into a cable are on reels 9, said reels being supported by cradles 10, two of which are connected between the aforesaid rotatable carriage 8 and a rotatable frame 1. The two rollers supporting the rotatable frame are not shown in FIGURE 3 but are shown in FIGURES 1 and 2, in front and side views.

The operation of the cable winding machine will not be explained in detail as the operation of such a device is well known to those skilled in the art.

I claim:
1. In a cable winding machine for laying up at least two conductors into a cable including a rotatable carriage, cradles for conductor pay-off reels mounted on said carriage, said carriage having at least one vertically mounted rotatable frame supported by rollers; the improvement wherein each roller is mounted in a pivotable support on an axis parallel to the plane of the roller and passing through both supports, said supports pivoting on said axis with the deflection of said frame from a vertical plane to maintain the rollers in alignment with said frame and the respective surfaces in optimum contact, and wherein each of said rollers is mounted within said support on a pivot located on said axis.

2. The machine of claim 1, wherein the axis of each of the rollers is rotatable in a vertical plane parallel to a vertical plane through the longitudinal axis of the machine.

3. The machine of claim 1, wherein each said roller is supported in a pivotable cradle.

References Cited

UNITED STATES PATENTS

| | | | |
|---|---|---|---|
| 1,218,009 | 3/1917 | Somerville | 57—58.34 XR |
| 1,642,834 | 9/1927 | Yeomans | 308—203 |
| 2,521,731 | 9/1950 | Kennedy | 308—203 XR |
| 3,000,169 | 9/1961 | Richaud | 57—58.34 |
| 3,234,721 | 2/1966 | Carter | 57—65 XR |

FOREIGN PATENTS

| | | |
|---|---|---|
| 737,976 | 7/1943 | Germany. |

STANLEY N. GILREATH, Primary Examiner
W. H. SCHROEDER, Assistant Examiner

U.S. Cl. X.R.
308—203